Figure 1:
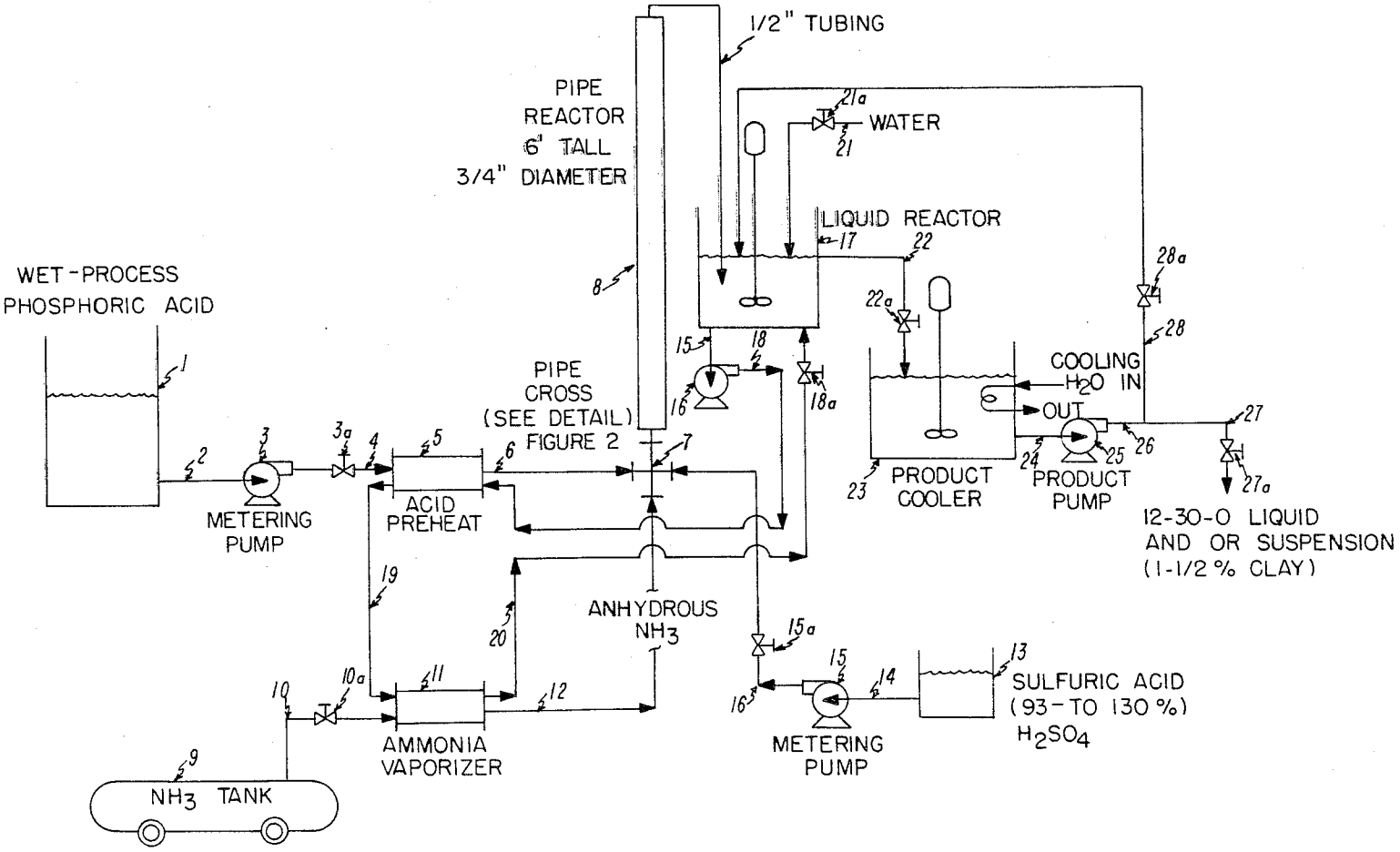
Figure 2:
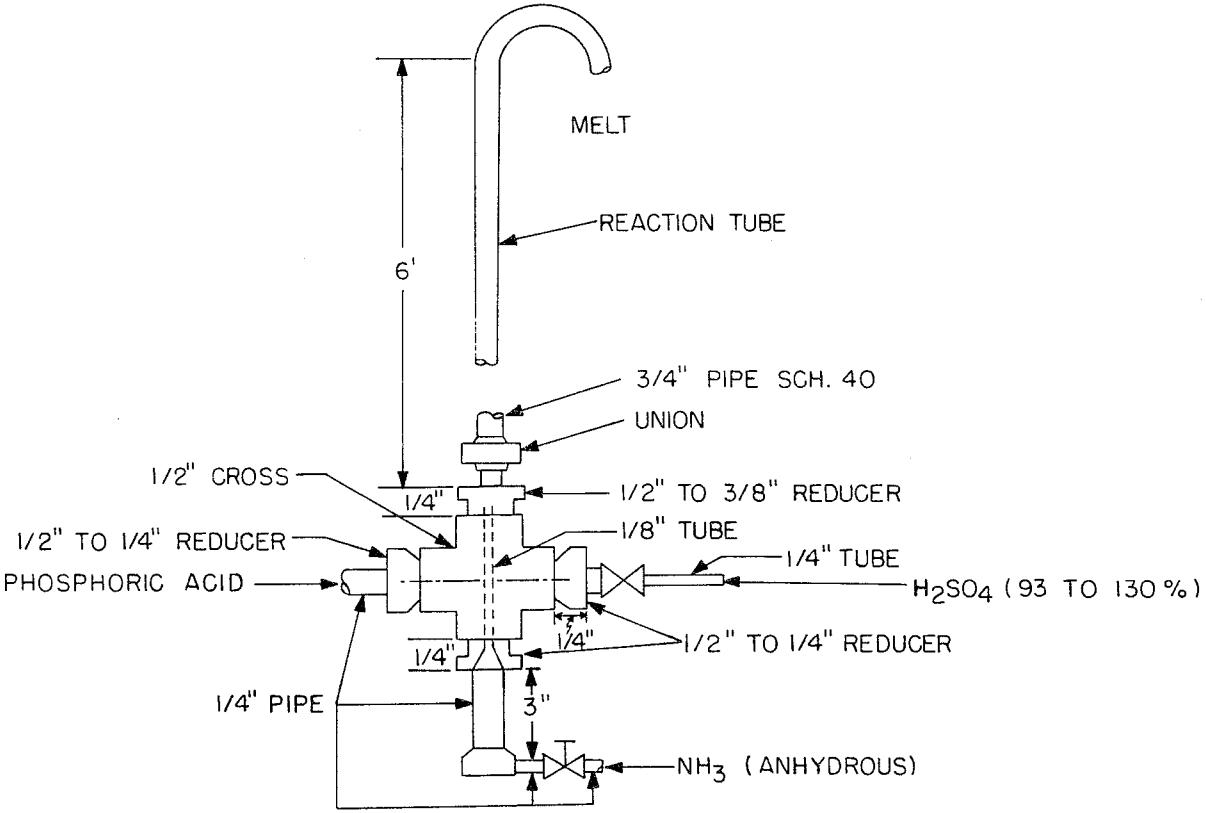

United States Defensive Publication [19] (H) [11] T101,901

Achorn et al. [43] Jun. 1, 1982

[54] AMMONIUM POLYPHOSPHATE SULFATE FERTILIZERS FROM WET-PROCESS PHOSPHORIC ACID

[76] Inventors: Frank P. Achorn, Box 176, Killen, Ala. 35645; Kenneth E. McGill, Rte. 1, Box 163, Virginia Shores, Sheffield, Ala. 35660

[21] Appl. No.: 285,213

[22] Filed: Jul. 20, 1981

[51] Int. Cl.[3] ..... C05B 7/00

[52] U.S. Cl. ..... 71/36; 71/40; 71/64.10

[57] ABSTRACT

A process for the production of fluid fertilizers (suspensions and/or solution type) made from merchant-grade phosphoric acid (50-58 percent $P_2O_5$), sulfuric acid, liquid anhydrous ammonia, and water, wherein liquid ammonia is heated in heat exchange means juxtaposed hot fertilizer product to form gaseous ammonia, which gaseous ammonia, along with phosphoric acid and sulfuric acid, is fed to a pipe-cross reactor wherein a melt of ammonium polyphosphate sulfate is formed, which melt is subsequently mixed with cooled recycled product to produce a fluid fertilizer with $N:P_2O_5$ weight ratios ranging from about 0.3 to 1, which contains from about 10 to 60 percent of its $P_2O_5$ values in the form of polyphosphates and 3 to 8 percent by weight sulfur. About 45 percent of the $P_2O_5$ as polyphosphate is easily attainable in the product with ambient acid feed temperatures, i.e., about 50° F. to 100° F., versus prior-art teachings of only about 15 percent poly formation with preheat of the feed acids. It is a solution when it is produced, and when diluted with 10 percent by weight water, it can be stored at 40° F. without the formation of troublesome crystals. When gelling clay is added, it stores well as a suspension and remains fluid at temperatures as low as −25° F.

6 Claims, 2 Sheets Drawing,

29 Pages Specification

The file of this unexamined application may be inspected and copies thereof may be purchased (849 O.G. 1221, Apr. 9, 1968).

FLOWSHEET FOR PRODUCTION OF AMMONIUM POLYHOSPHATE SULFATE FLUIDS

DETAIL OF PIPE CROSS FOR JOINING PHOSPHORIC ACID, $NH_3$, AND $H_2SO_4$